(12) United States Patent
Sorensen

(10) Patent No.: US 8,774,260 B2
(45) Date of Patent: Jul. 8, 2014

(54) DELAY ESTIMATION

(75) Inventor: Karsten Vandborg Sorensen, Stockholm (SE)

(73) Assignee: Microsoft Corporation, Redmond, WA (US)

( * ) Notice: Subject to any disclaimer, the term of this patent is extended or adjusted under 35 U.S.C. 154(b) by 58 days.

(21) Appl. No.: 13/467,927

(22) Filed: May 9, 2012

(65) Prior Publication Data

US 2013/0230086 A1 Sep. 5, 2013

(30) Foreign Application Priority Data

Mar. 5, 2012 (GB) .................................. 1203816.2

(51) Int. Cl.
*H04B 3/46* (2006.01)
(52) U.S. Cl.
USPC .......................................................... 375/227
(58) Field of Classification Search
None
See application file for complete search history.

(56) References Cited

U.S. PATENT DOCUMENTS

| | | | |
|---|---|---|---|
| 5,646,991 A * | 7/1997 | Sih ............................ | 379/406.08 |
| 6,377,682 B1 | 4/2002 | Benesty et al. | |
| 6,574,337 B1 * | 6/2003 | Kawada .................... | 379/406.08 |
| 6,757,384 B1 | 6/2004 | Ketchum et al. | |
| 6,766,019 B1 * | 7/2004 | Benesty et al. .......... | 379/406.01 |
| 6,922,403 B1 | 7/2005 | Yoo | |
| 7,031,269 B2 | 4/2006 | Lee | |
| 7,711,107 B1 * | 5/2010 | Murgia et al. ............ | 379/406.05 |
| 8,085,930 B2 * | 12/2011 | Sórensen et al. ......... | 379/406.04 |
| 8,184,818 B2 * | 5/2012 | Ishiguro ........................... | 381/66 |
| 8,265,231 B2 * | 9/2012 | Otani et al. ................. | 379/22.03 |
| 8,280,036 B2 * | 10/2012 | Cendrillon et al. ....... | 379/406.06 |
| 2003/0016815 A1 * | 1/2003 | Kurtz et al. .............. | 379/406.01 |
| 2004/0141608 A1 | 7/2004 | Imata | |
| 2006/0140392 A1 * | 6/2006 | Ahmadi ..................... | 379/406.1 |
| 2007/0258578 A1 | 11/2007 | Hirai et al. | |
| 2007/0263851 A1 * | 11/2007 | Sukkar et al. ............ | 379/406.01 |
| 2008/0219432 A1 * | 9/2008 | Ahmadi .................... | 379/406.06 |
| 2008/0292109 A1 * | 11/2008 | Trump et al. .................... | 381/66 |
| 2009/0063142 A1 * | 3/2009 | Sukkar .......................... | 704/226 |

(Continued)

FOREIGN PATENT DOCUMENTS

| | | |
|---|---|---|
| JP | 59167131 | 9/1984 |
| JP | 07283859 | 10/1995 |
| KR | 20030013579 | 2/2003 |
| WO | WO-9827668 | 6/1998 |

OTHER PUBLICATIONS

Sukkar, Rafid A., "Echo Detection and Delay Estimation Using a Pattern Recognition Approach and Cepstral Correlation", Retrieved at <<http://ieeexplore.ieee.org/stamp/stamp.jsp?tp=&arnumber=4218249 >>, IEEE International Conference on Acoustics, Speech and Signal Processing, ICASSP, Apr. 15, 2007, pp. 909-912.

(Continued)

*Primary Examiner* — Chieh M Fan
*Assistant Examiner* — Bahman Badipour
(74) *Attorney, Agent, or Firm* — Sonia Cooper; Jim Ross; Micky Minhas

(57) ABSTRACT

A delay between a first signal and a second signal is estimated. The first signal and second signals are received and for each of a plurality of candidate delays between the signals, a correlation value is determined. Based on the correlation values, one of the candidate delays is selected to be used as an estimate of the delay between the first and second signals.

21 Claims, 6 Drawing Sheets

(56) References Cited

U.S. PATENT DOCUMENTS

2010/0290615 A1* 11/2010 Takahashi ............... 379/406.08
2012/0076287 A1* 3/2012 Ramalingam et al. ... 379/202.01
2012/0163612 A1* 6/2012 Sorensen et al. ............... 381/66

OTHER PUBLICATIONS

"Search Report", GB Application No. 1203816.2, Aug. 16, 2013, 6 pages.

* cited by examiner

DELAY ESTIMATION

RELATED APPLICATION

This application claims priority under 35 USC 119 or 365 to Great Britain Application No. 1203816.2 filed 5 Mar. 2012, the disclosure of which is incorporate in its entirety.

BACKGROUND

There are situations in which it can be useful to determine a delay between two (or more) signals so that time-dependent processing can be performed on one or more of the signals in a synchronised manner across the signals. For example, when a user is engaging in a call (e.g. an audio or video call) over a communication system, a far-end audio signal is received at a device of the user and is output from the device to the user. At the same time the user's device receives a near-end audio signal from the user for transmission to the far-end of the call. The near-end signal may include unwanted echo components of the far-end signal that is output from the device, and the device may utilise an echo canceller in order to cancel (that is, attenuate or suppress) the echo components in the near-end signal before it is transmitted to the far-end in the call. Modern communication systems are based on the transmission of digital signals. The received analogue information of the near-end signal, (for example including speech from the user, noise and echo components), is input into an analogue to digital converter at the device and converted into a digital signal. The digital signal is then encoded and transmitted in data packets over a channel to a device at the far-end of the call.

In order to cancel echo components in a near-end signal, an echo canceller uses an estimate of the delay between a component of the far-end signal being received over the communication system at the device and a corresponding echo component being received in the near-end signal at the input means (e.g. microphone) of the device. There is a finite delay between these two events due to, for example: (i) processing delays in receiving and outputting the far-end signal at the device, and (ii) the time taken for the signal to travel from the output means of the device (e.g. speakers) to the input means of the device (e.g. a microphone). Echo, such as that described above, which results from outputting the far-end audio signal from speakers of a device and then receiving corresponding echo components of the outputted signal at a microphone of the device is termed "acoustic echo".

In order to estimate the delay between the far-end and near-end signals a plurality of candidate delays may be assessed and the "best" candidate delay is selected as the estimate of the delay between the far-end and near-end signals. In order to determine which of the candidate delays is the "best", a respective correlation value can be determined for each of the plurality of candidate delays. Whichever of the candidate delays results in the highest correlation value between the far-end and near-end signals can be determined to be the "best" and can therefore be used as the estimate of the delay between the far-end and near-end signals. The "correlation value" may be any measure of the similarity between the signals, and may, for example, be calculated by performing a mathematical correlation operation or covariance operation on the two signals.

SUMMARY

According to one embodiment, there is provided a method of estimating a delay between a first signal and a second signal, the method comprising:

receiving the first signal;
receiving the second signal;
for each of a plurality of candidate delays between the received first signal and the received second signal, determining a correlation value between the received first signal and the received second signal; and
based on the determined correlation values, selecting one of the plurality of candidate delays to be used as an estimate of the delay between the received first signal and the received second signal, wherein the method further comprises:
determining that a disturbance condition is present on the received second signal for at least one of the plurality of candidate delays;
while the disturbance condition is determined to be present, for each of said at least one of the plurality of candidate delays: determining an artificial second signal, wherein the artificial second signal is determined such that a correlation value for the candidate delay between the received first signal and the artificial second signal is kept constant at a value based on a determined correlation value for the candidate delay between the received first signal and the received second signal prior to determining that the disturbance condition is present; and
while the disturbance condition is determined to be present, using the artificial second signals for said at least one of the plurality of candidate delays in order to select one of the plurality of candidate delays to be used as the estimate of the delay between the received first signal and the received second signal.

When the disturbance condition is determined to be present on the second signal, the first signal continues to be received, and rather than using only the second signal (which includes disturbance), artificial second signals are determined and used to select one of the plurality of candidate delays to be used as the estimate of the delay between the received first signal and the received second signal. The artificial second signals are determined in such a way that a respective correlation value for each of the candidate delays between the received first signal and the respective artificial second signal is kept constant at a value based on a determined correlation value for the candidate delay between the received first signal and the received second signal prior to determining that the disturbance condition is present. For example, the value may be equal to the latest correlation value that was determined for that candidate delay between the received first signal and the received second signal prior to determining that the disturbance condition is present.

In one or more embodiments the method is implemented in a call and the first signal is a far-end signal whilst the second signal is a near-end signal of the call.

The step of using the artificial second signals for said at least one of the plurality of candidate delays in order to select one of the plurality of candidate delays may comprise: based on the correlation values for said at least one of the plurality of candidate delays between the received first signal and the artificial second signals, selecting one of the plurality of candidate delays to be used as the estimate of the delay between the received first signal and the received second signal. The step of using the artificial second signals for said at least one of the plurality of candidate delays in order to select one of the plurality of candidate delays may comprise using the artificial second signals in place of the received second signal for said at least one of the plurality of candidate delays in order to select one of the plurality of candidate delays. Alternatively, the step of using the artificial second signals for said at least one of the plurality of candidate delays in order to select one of the plurality of candidate delays may comprise using the artificial second signals in combination with the received second signal for said at least one of the plurality of candidate delays in order to select one of the plurality of candidate delays.

The method may be implemented in a device, wherein the first signal may be received at the device over a network and subsequently output from the device, and wherein the second signal may be received using input means of the device, the second signal including: (i) echo components originating from the outputted first signal, and (ii) disturbance components. The disturbance components may result from at least one of: (i) speech signals received at the input means of the device, (ii) clipping of the received second signal due to overloading of components of the device, and (iii) noise received at the input means of the device. The disturbance condition may be determined to be present on the received second signal when the ratio of the power of the disturbance components to the power of the echo components exceeds a threshold value. The disturbance condition may be determined to be present on the received second signal when the disturbance components have speech characteristics which differ from characteristics of the echo components, thereby indicating a double-talk condition.

The first and second signals may be audio signals. The method may implemented during a call between two users over a communication system, wherein the first signal is a far-end signal of the call and the second signal is a near-end signal of the call.

The correlation value between the first signal received at time $t_1$ and the second signal received at time $t_2$ may be a cross-covariance coefficient, $r_{XY}(t_1,t_2)$, given by the equation:

$$r_{XY}(t_1,t_2)=C_{XY}(t_1,t_2)/\text{sqrt}(C_{XX}(t_1,t_1)*C_{YY}(t_2,t_2)),$$

where $C_{XY}(t_1,t_2)$ is a cross-covariance function between the first signal at time $t_1$ and the second signal at time $t_2$, $C_{XX}(t_1,t_1)$ is a cross-covariance function between the first signal at time $t_1$ and the first signal at time $t_1$, and $C_{YY}(t_2,t_2)$ is a cross-covariance function between the second signal at time $t_2$ and the second signal at time $t_2$. When the mean of the first signal is zero and the mean of the second signal is zero: (i) the cross-covariance function $C_{XY}(t_1,t_2)$ may be represented by an estimate of the ensemble average over time of the product of first signal at time $t_1$, $X(t_1)$, and the second signal at time $t_2$, $Y(t_2)$, said estimate of the ensemble average being determined using a first order recursive filter; (ii) the cross-covariance function $C_{XX}(t_1,t_1)$ is represented by an estimate of the ensemble average over time of the product of first signal at time $t_1$, $X(t_1)$, and the first signal at time $t_1$, $X(t_1)$; and (iii) the cross-covariance function $C_{YY}(t_2,t_2)$ is represented by an estimate of the ensemble average over time of the product of second signal at time $t_2$, $Y(t_2)$, and the second signal at time $t_2$, $Y(t_2)$.

The method may further comprise applying echo cancellation to the received second signals to cancel echo in the received second signal, said echo resulting from an output of the first signal, wherein the echo cancellation uses the estimate of the delay between the received first signal and the received second signal.

The step of determining that a disturbance condition is present on the received second signal for at least one of the plurality of candidate delays may comprise separately determining for each of the plurality of candidate delays whether the disturbance condition is present on the received second signal. Alternatively, the step of determining that a disturbance condition is present on the received second signal for at least one of the plurality of candidate delays may comprise making a determination that the disturbance condition is present for all of the plurality of candidate delays. In one or more embodiments, there is provided a device for estimating a delay between a first signal and a second signal, the device comprising:

first receiving means for receiving the first signal;
second receiving means for receiving the second signal;
correlation determining means for determining, for each of a plurality of candidate delays between the received first signal and the received second signal, a correlation value between the received first signal and the received second signal;
selecting means for selecting one of the plurality of candidate delays, based on the determined correlation values, to be used as an estimate of the delay between the received first signal and the received second signal;
disturbance determining means for determining that a disturbance condition is present on the received second signal for at least one of the plurality of candidate delays; and
signal determining means for determining an artificial second signal for each of said at least one of the plurality of candidate delays while the disturbance condition is determined to be present, wherein the signal determining means is configured to determine the artificial second signal for each of said at least one of the plurality of candidate delays such that a correlation value for the candidate delay between the received first signal and the artificial second signal is kept constant at a value based on a determined correlation value for the candidate delay between the received first signal and the received second signal prior to determining that the disturbance condition is present,
wherein the device is configured such that while the disturbance condition is determined to be present, the device is configured to use the artificial second signals for said at least one of the plurality of candidate delays in order to select one of the plurality of candidate delays to be used as the estimate of the delay between the received first signal and the received second signal.

The device may be configured to use the artificial second signals in place of the received second signal for said at least one of the plurality of candidate delays in order to select one of the plurality of candidate delays to be used as the estimate of the delay between the received first signal and the received second signal. Alternatively, the device may be configured to use the artificial second signals in combination with the received second signal for said at least one of the plurality of candidate delays in order to select one of the plurality of candidate delays to be used as the estimate of the delay between the received first signal and the received second signal.

The first receiving means may comprise a network interface and the second receiving means may comprise a microphone. The device may further comprise echo cancelling means for applying echo cancellation to the received second signals to cancel echo in the received second signal, said echo resulting from an output of the first signal at the device, wherein the echo cancelling means may be configured to use the estimate of the delay between the received first signal and the received second signal in said echo cancellation.

In one or more embodiments, there is provided a computer program product for estimating a delay between a first signal and a second signal, the computer program product being embodied on a non-transient computer-readable medium and configured so as when executed on a processor of a device to perform the method steps described herein for estimating said delay.

BRIEF DESCRIPTION OF THE DRAWINGS

For a better understanding of the various embodiments and to show how the same may be put into effect, reference will now be made, by way of example, to the following drawings in which.

DETAILED DESCRIPTION

Figure 1:
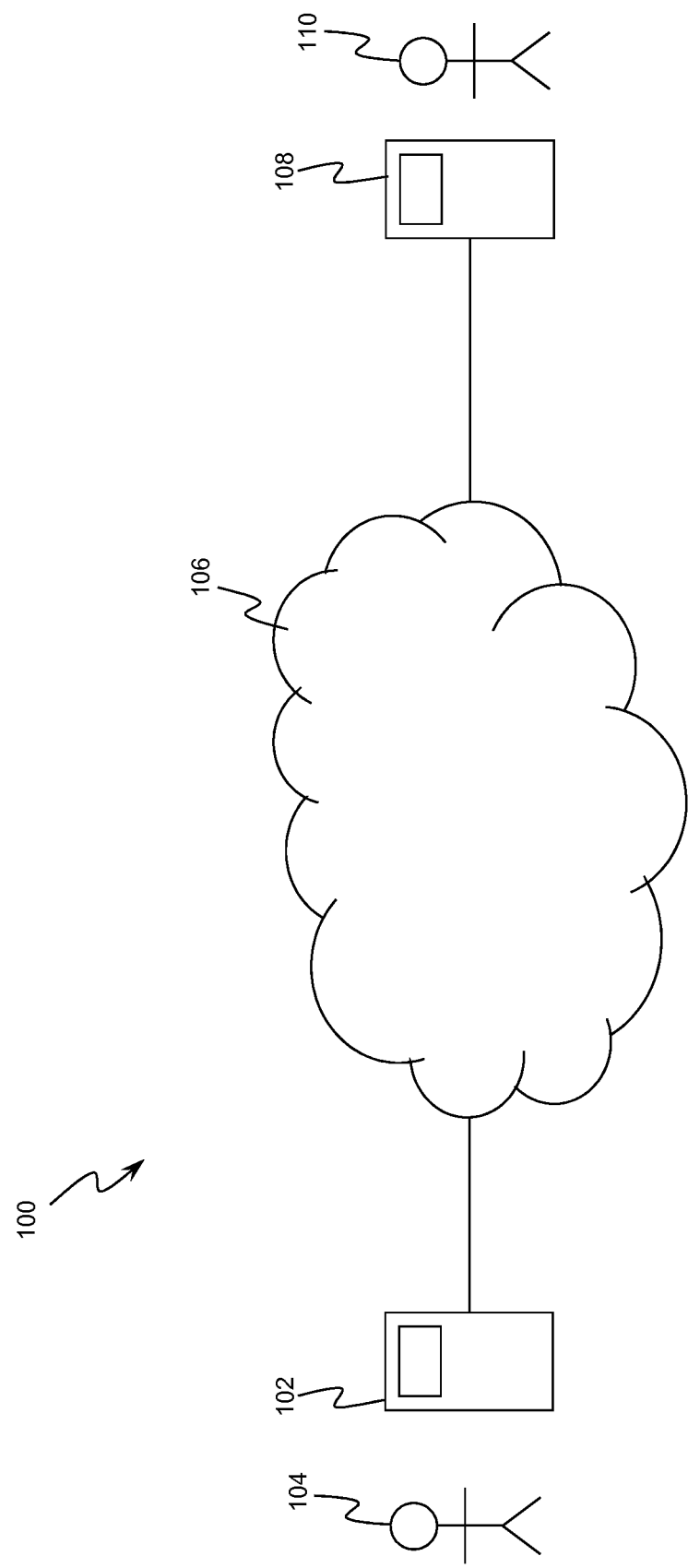
FIG. 1 shows a communication system according to one or more embodiments.

The delay estimation described in the background section above may work well when a large proportion of the power of the near-end signal results from echo from the far-end signal, i.e. there is a "clean echo" in the received near-end signal. However, the delay estimation described above in the background section has problems when there is disturbance to the echo components in the near-end signal. In particular, when the delay estimation process includes recursively updating the terms used to calculate the correlation value (e.g. a cross-covariance coefficient), the delay estimation becomes challenging when there is disturbance to the echo components on the near-end signal. In such a delay estimation process, each delay candidate would be updated as if it represented the correct echo path delay, and the disturbance to the echo components may affect the calculation of the correlation values to the extent that the highest correlation value does not represent the true delay between the far-end and near-end signals.

For example, in a double talk condition, when the near-end user and the far-end user of a call are talking simultaneously, the near-end activity acts as a disturbance of the echo components in the near-end signal when it comes to estimating the delay between the far-end and near-end signals. Other near-end activity, such as strong background noise (e.g. traffic noise or music that is present in the vicinity of the device receiving the near-end signal) may also act as disturbance of the echo components in the near-end signal when it comes to estimating the delay between the far-end and near-end signals.

Another cause of disturbance to the echo components in the near-end signal may be clipping due to an overloaded near-end signal. The near-end signal is said to be overloaded when the near-end signal subjects components in the device, such as a microphone and other components processing the near-end signal to a load that exceeds the load that the components were designed to handle. This causes a non-linear distortion of the near-end signal. In particular the amplitude of the signal output from the components processing the near-end signal becomes clipped. Such clipping may act as disturbance of the echo components in the near-end signal when it comes to estimating the delay between the far-end and near-end signals.

It is problematic to update the calculation of the correlation values for the candidate delays during periods of disturbance to the echo components of the near-end signal, and that it would be advantageous to make the delay estimation robust to disturbances or interferences to the echo components of the near-end signal.

In order to achieve this, in various embodiments, when a disturbance condition is present on the near-end signal, artificial near-end signals are generated and used in place of the received near-end signals for the estimation of the delay between the far-end and near-end signals. In this way, the detrimental effect to the estimation of the delay caused by the disturbance on the near-end signals is reduced. Since the disturbance affects the near-end signals but not the far-end signals, the far-end signals continue to be received and used in the estimation of the delay between the far-end and near-end signals. As described in more detail below, the artificial signals are generated such that when the disturbance occurs on the near-end signal the artificial signals can replace the near-end signals in the delay estimation process and the covariance coefficient between the far-end and near-end signals is kept constant while the disturbance occurs.

Various embodiments will now be described by way of example only.

FIG. 1 shows a communication system 100 comprising a first user 104 who is associated with a first user device 102 and a second user 110 who is associated with a second user device 108. In other embodiments the communication system 100 may comprise any number of users and associated user devices. The user devices 102 and 108 can communicate over the network 106 in the communication system 100, thereby allowing the users 104 and 110 to communicate with each other over the network 106. In one or more embodiments, the communication system 100 is a packet-based, P2P communication system, but other types of communication system could also be used, such as non-P2P, VoIP or IM systems. The network 106 may, for example, be the Internet or another type of network such as a telephone network (such as the PSTN or a mobile telephone network). The user device 102 may be, for example, a mobile phone, a television, a personal digital assistant ("PDA"), a personal computer ("PC") (including, for example, Windows™, Mac OS™ and Linux™ PCs), a gaming device or other embedded device able to connect to the network 106. The user device 102 is arranged to receive information from and output information to the user 104 of the user device 102. In one or more embodiments, the user device 102 comprises a display such as a screen and an input device such as a keypad, a touch-screen, and/or a microphone. The user device 102 is connected to the network 106.

The user device 102 executes a communication client, provided by a software provider associated with the communication system 100. The communication client is a software program executed on a local processor in the user device 102. The client performs the processing required at the user device 102 in order for the user device 102 to transmit and receive data over the communication system 100. The client executed at the user device 102 may be authenticated to communicate over the communication system through the presentation of digital certificates (e.g. to prove that user 104 is a genuine subscriber of the communication system).

The user device 108 may correspond to the user device 102. The user device 108 executes, on a local processor, a communication client which corresponds to the communication client executed at the user device 102. The client at the user device 108 performs the processing required to allow the user 110 to communicate over the network 106 in the same way that the client at the user device 102 performs the processing required to allow the user 104 to communicate over the network 106. The user devices 102 and 108 are end points in the communication system. FIG. 1 shows only two users (104 and 110) and two user devices (102 and 108) for clarity, but many more users and user devices may be included in the communication system 100, and may communicate over the communication system 100 using respective communication clients executed on the respective user devices.

Figure 2:
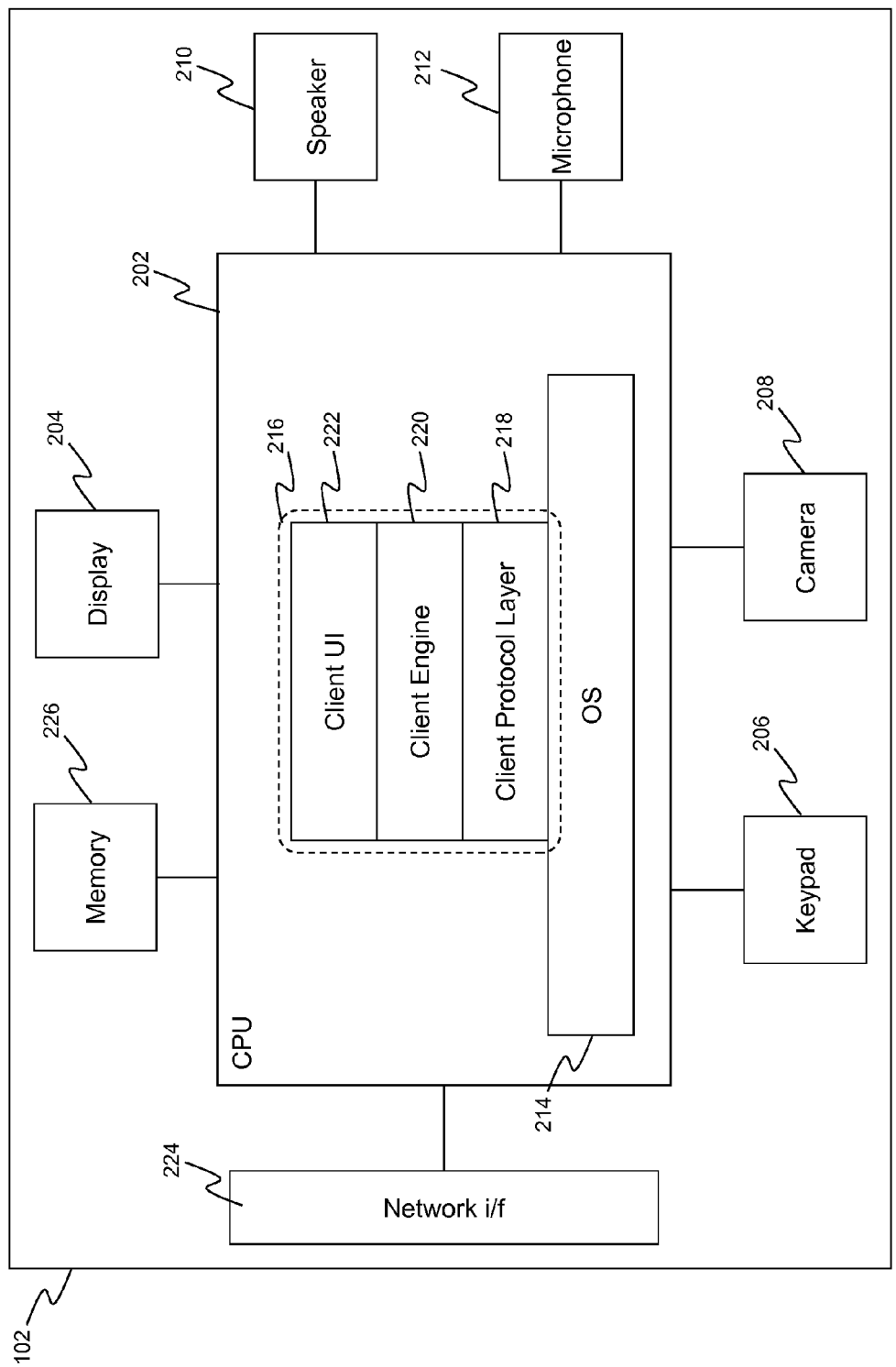
FIG. 2 shows a schematic view of a device according to one or more embodiments.

FIG. 2 illustrates a detailed view of the user device 102 on which is executed a communication client for communicating over the communication system 100 in accordance with one or more embodiments. The user device 102 comprises a central processing unit ("CPU") 202, to which is connected a display 204 such as a screen, input devices such as a keypad 206 and a camera 208. An output audio device 210 (e.g. a speaker) and an input audio device 212 (e.g. a microphone) are connected to the CPU 202. The display 204, keypad 206, camera 208, output audio device 210 and input audio device 212 may be integrated into the user device 102 as shown in FIG. 2. In alternative user devices one or more of the display 204, the keypad 206, the camera 208, the output audio device 210 and the input audio device 212 may not be integrated into the user device 102 and may be connected to the CPU 202 via respective interfaces. One example of such an interface is a USB interface. The CPU 202 is connected to a network interface 224 such as a modem for communication with the network 106. The network interface 224 may be integrated into the user device 102 as shown in FIG. 2. In alternative user devices the network interface 224 is not integrated into the user device 102. The user device 102 also comprises a memory 226 for storing data.

FIG. 2 also illustrates an operating system ("OS") 214 executed on the CPU 202. Running on top of the OS 214 is a software stack 216 for the client software of the communication system 100. The software stack shows a client protocol layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the network 106 via the network interface 224. The client protocol layer 218 of the client software communicates with the operating system 214 and manages the connections over the communication system. Processes requiring higher level processing are passed to the client engine layer 220. The client engine 220 also communicates with the client user interface layer 222. The client engine 220 may be arranged to control the client user interface layer 222 to present information to the user 104 via the user interface of the client and to receive information from the user 104 via the user interface.

The user device 108 is implemented in the same way as user device 102 as described above, wherein the user device 108 may have corresponding elements to those described herein in relation to user device 102.

Figure 3:
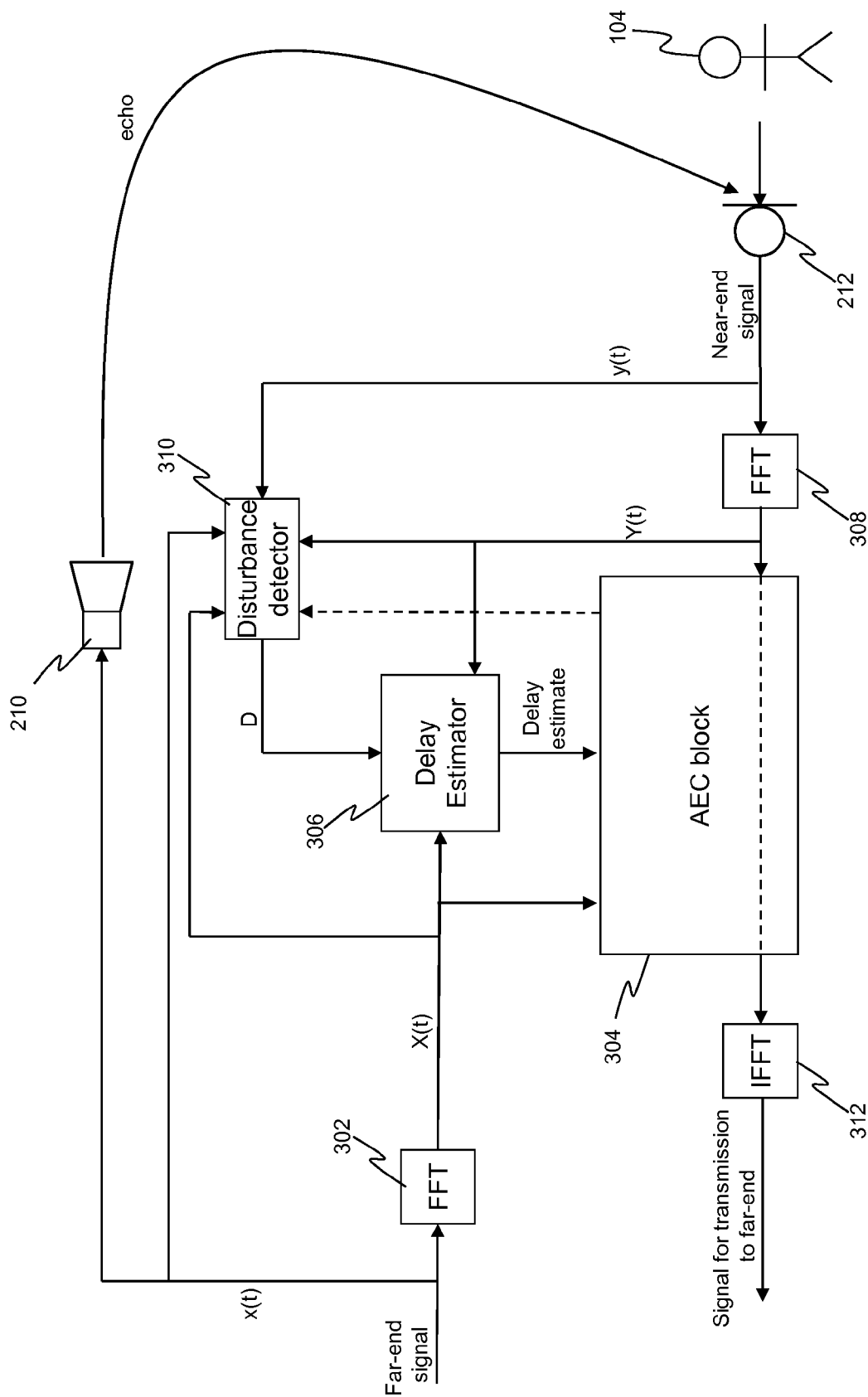
FIG. 3 shows a functional block diagram of the device according to one or more embodiments.

FIG. 3 shows the user device 102 being implemented as a near-end device in a call with the device 108 over the communication system 100 in more detail in accordance with one or more embodiments. FIG. 3 shows the user device 102 comprising the microphone 212, the loudspeaker 210, far-end and near-end Fast Fourier Transform (FFT) blocks 302 and 308, an Acoustic Echo Cancellation (AEC) block 304, a delay estimator block 306, a disturbance detector block 310 and an Inverse Fast Fourier Transform (IFFT) block 312. Each of these components may be implemented as hardware in the device 102 or as software running on the processor 202 in the device (e.g. as part of the communication client executed on the processor 202).

The device 102 is arranged to receive a far-end signal transmitted from the far-end device 108 in a call over the communication system (via the network 104) between the users 104 and 110. The far-end signal received at the device 102 is coupled to the far-end FFT block 302, to a first input of the disturbance detector block 310 and to the loudspeaker 210 for output therefrom. An output, X(t), of the far-end FFT block 302 is coupled to a first input of the delay estimator 306, to a second input of the disturbance detector block 310 and to a first input of the AEC block 304. In alternative embodiments (not shown in the Figures), the signal received at the FFT block 302 may comprise any information generated at the near-end device 102 that is output via the loudspeaker 210, for example speech synthesis of text, playback of a recording, voice mail, or ring tones.

The microphone 212 is configured to receive an input near-end signal which comprises a near-end component such as speech input from the user 104 of the device 102 and background noise, and an echo component resulting from the far-end signal after it has traversed the echo path between the loudspeaker 210 and the microphone 212. An output of the microphone 212 is coupled to an input of the near-end FTT block 308 and also to a third input of the disturbance detector block 310. An output, Y(t), of the near-end FFT block 308 is coupled to a second input of the AEC block 304 and to a fourth input of the disturbance detector block 310 and to a second input of the delay estimator block 306. An output of the disturbance detector block 310 is coupled to a third input of the delay estimator block 306. An output of the delay estimator block 306 is coupled to a third input of the AEC block 304. A first output of the AEC block 304 is coupled to an input of the IFFT block 312. A second output of the AEC block 304 is coupled to a fifth input of the disturbance detector block 310. An output of the IFFT block 312 provides a signal for transmission to the far-end device 108 in the call.

The AEC block 304 is arranged to apply a gain to the near-end signal Y(t) (in the frequency domain) to remove an estimate of the echo component. The estimate of the echo component removed from the near end signal is provided by an echo path model determined by the AEC block 304. The operation of the AEC block 304 will be implementation dependent.

In operation, the device 102 outputs a signal from the IFFT block 312 to be transmitted to the far-end device 108 via the network 104. The output signal is the resulting signal after the echo component has been removed or reduced from the near-end signal by the AEC block 304.

The near-end signal is input into the near-end FFT block 308. The near-end FFT block 308 transforms the near-end time domain signal into a frequency domain signal, Y(t). Similarly, the far-end signal is input into the far-end FFT block 302. The far-end FFT block 302 transforms the far-end time domain signal into a frequency domain signal, X(t).

The far-end (frequency domain) signal X(t) output from the far-end FFT block 302 is input into the delay estimator block 306. Similarly, the near-end (frequency domain) signal T(t) output from the near-end FFT block 308 is input into delay estimator block 306. In operation, the delay estimator block 306 determines an estimate of the delay between the far-end signal X(t) and the near-end signal Y(t), as described in more detail below with reference to FIG. 4.

The far-end signal in both the frequency and time domains, the near-end signal in both the frequency time domains and internal information from the AEC block 304 (such as the echo path) are input into the disturbance detector block 310 which determines whether there is a disturbance condition on the near-end signal. In preferred embodiments, the disturbance detector block 310 determines whether there is disturbance in the near-end signal separately for each of a plurality of N candidate delays (described in detail below), and provides N values of D for the respective N candidate delays. In other embodiments just one value of D may be determined for use with all of the candidate delays. The output of the disturbance detector block 310, D, indicates whether or not there is a disturbance condition on the near-end signal Y(t). As described above, D may be a plurality of signals, or may be a single value. For example, each value of D may be a binary bit signal, whereby D=0 when there is not a disturbance condition present on the near-end signal Y(t), whereas D=1 when there is a disturbance condition present on the near-end signal Y(t). A disturbance condition is present when the echo components in the near-end signal are significantly disturbed by disturbance components in the near-end signal. The "disturbance components" are any components of the near-end signal which are not caused by the echo (i.e. anything other than the echo components). For example, the echo components in the near-end signal may be disturbed by near-end activity, e.g. speech from the user 104 or noise received by the microphone 212. As an example, the disturbance condition may be determined to be present on the near-end signal when the ratio of the power of the disturbance components in the near-end signal to the power of the echo components in the near-end signal exceeds a threshold value. Alternatively, the disturbance condition may be determined to be present on the near-end signal based on particular characteristics of the near-end signal, for example when the disturbance components have speech characteristics which differ from the characteristics of the echo, thereby indicating a double-talk condition in the call. The disturbance detector block 310 uses the near-end signal in the time domain (as well as the near-end signal in the frequency domain) because although time domain clipping can be detected in both the time and frequency domains, it is a much easier task to detect the time domain clipping in the time domain.

The signal(s) D is(are) passed to the delay estimator block 306 and is(are) used in the process of estimating the delay between the far-end and near-end signals as described in more detail below with reference to FIG. 4.

The AEC block 304 receives the far-end signal Y(t) from the far-end FFT block 302, the near-end signal X(t) from the near-end FFT block 308 and the delay estimate from the delay estimator block 306. Based on these inputs the AEC block 304 operates to cancel (i.e. attenuate or suppress) the echo components in the near-end signal Y(t), as is known in the art. Since the echo cancellation process is known in the art, precise details of this process are not described herein. Furthermore, the echo cancellation process might not be implemented all of the time during a call. For example, the echo cancellation process might only be implemented when the amplitude of the far-end signal exceed a threshold value. Similarly, the delay estimation process implemented by the delay estimator block 306 might not be implemented all of the time during a call, and may for example only be implemented when the echo cancellation process is also implemented.

The AEC block 304 applies a gain to the near-end signal Y(t), wherein the magnitude of the gain will necessarily be less than or equal to 1. As such the applied gain will attenuate the power in the near-end signal Y(t) to remove the echo signal component. The echo reduced near-end signal Y(t) (which is in the frequency domain) is then input into the IFFT block 312, which transforms the attenuated near-end signal Y(t) to the time domain to produce the output signal to be transmitted to the far-end device 108 in the call.

Figure 4:
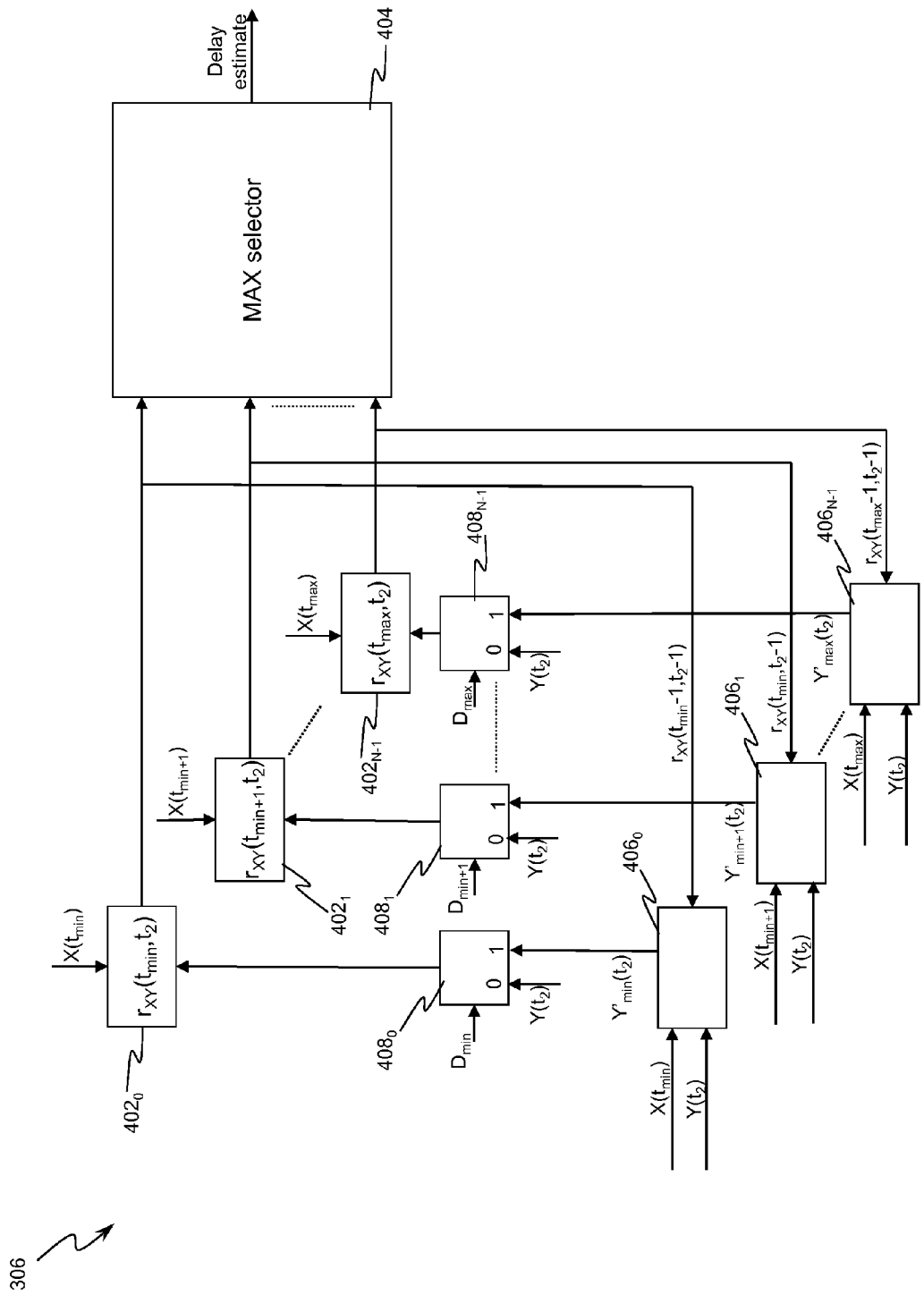
FIG. 4 shows a functional block diagram of a delay estimator block according to one or more embodiments.

With reference to FIG. 4 the delay estimator block 306 according to preferred embodiments is now described in greater detail in accordance with one or more embodiments. The delay estimator block 306 uses a set of N candidate delays and determines which of those candidate delays provides the "best" estimate of the delay between the far-end signal X(t) and the near-end signal Y(t). This is achieved by comparing correlation values between the signals X(t) and Y(t) for each of the candidate delays and selecting the candidate delay which has the highest correlation value to be the estimate of the delay between the far-end and near-end signals.

The delay estimator block 306 comprises, for the plurality of N candidate delays, a respective plurality of N correlating blocks 402, a respective plurality of N signal generating blocks 406 and a respective plurality of N multiplexer blocks 408. The delay estimator block 306 also comprises a maximum selector block 404. FIG. 4 shows the delay estimator block 306 receiving the near-end signal Y at time $t_2$. The far-end signal X is delayed according to the N candidate delays to create N delayed versions of the far-end signal over the time range from $t_{min}$ to $t_{max}$. The largest of the N candidate delays is $(t_2-t_{min})$ and the smallest of the N candidate delays is $(t_2-t_{max})$. Since there are N candidate delays, max=min+N−1, such that $t_{max}=t_{min+N-1}$. The N delayed versions of the far-end signal are coupled to respective inputs of the N correlating blocks 402 and of the N signal generating blocks 406. The near-end signal $Y(t_2)$ is coupled to respective inputs of the signal generating blocks 406 and to respective first inputs of the multiplexer blocks 408. Outputs of the signal generating blocks 406 are coupled to respective second inputs of the corresponding multiplexer blocks 408. Outputs of the multiplexer blocks 408 are coupled to respective inputs of the corresponding correlating blocks 402. Outputs of the correlating blocks 402 are coupled to respective inputs of the corresponding signal generating blocks 406. The outputs of the correlating blocks 402 are also coupled to inputs of the maximum selector block 404. An output of the maximum selector block 404 provides a delay estimate as the output of the delay estimator block 306.

Figure 5:
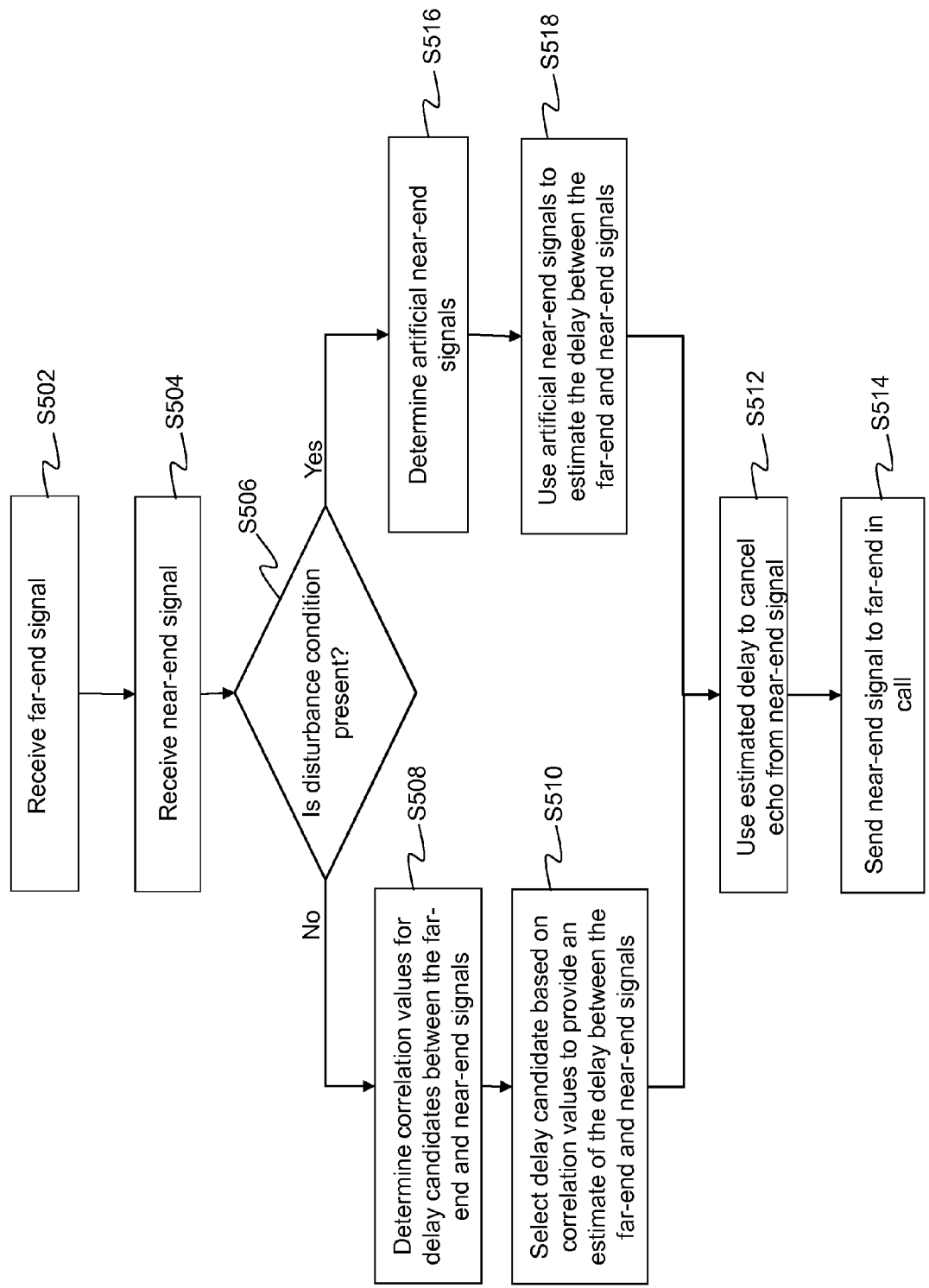
FIG. 5 is a flow chart for a process of estimating a delay between far-end and near-end signals according to one or more embodiments.

With reference to the method shown in the flow chart of FIG. 5, in operation, the device 102 receives, at the network interface 224 in step S502, the far-end signal from the far-end device 108 over the network 106. In step S504 the device 102 receives the near-end signal at the microphone 212. In step S506 the disturbance detector block 310 determines whether a disturbance condition is present on the near-end signal Y(t) as described above. In one or more embodiments, the disturbance detector block 310 determines whether there is disturbance in the near-end signal separately for each of the plurality of N candidate delays, and provides N values of D ($D_{min}$ to $D_{max}$) for the respective N candidate delays. In other embodiments just one value of D may be determined for use with all of the candidate delays. In order to determine whether a disturbance condition is present on a frame of the near-end signal $Y(t_2)$ received at time $t_2$, an estimate of the echo for that frame is used. Internal information of the echo path is passed from the AEC block 304 to the disturbance detector block 310 for this purpose. The estimate of the echo depends on the delay between the far-end signal and the near-end signal. The estimate of the echo is determined separately for each candidate delay as if that candidate delay was the correct delay.

This allows the system to recover faster from any delay estimation errors. For this reason, in one or more embodiments the disturbance detection determination implemented by the disturbance detector block 310 is performed for each candidate delay separately. This means that in some situations a disturbance condition may be determined to be present at a given time for some of the candidate delays but not for others of the candidate delays, such that for some of the candidate delays the artificial near-end signals Y' are used, whilst for other candidate delays the received near-end signal Y is used.

When there is little or no disturbance on the near-end signal Y(t) such that D=0 for a candidate delay then the method passes to step S508. Since D=0, the multiplexer blocks 408 pass the near-end signal Y(t) to the correlating blocks 402.

In step S508 the correlating blocks 402 then determine a correlation value between the far-end signal X and the near-end signal Y for the plurality of N candidate delays between the far-end and near-end signals. The correlation values can be any values which indicate the similarity between the signals. For example, the correlation values may be cross-covariance coefficients, $r_{XY}$, as shown in FIG. 4, or could be the result of a mathematical correlation operation applied to the signals, or any other suitable function. The correlation values are output from the correlating blocks 402 to the maximum selector block 404 which, in step S510, selects the candidate delay with the highest of the correlation values to be used as the estimate of the delay between the far-end signal X and the near-end signal Y. This process works well when there is little or no disturbance on the near-end signal Y.

Then in step S512 the estimated delay is passed from the delay estimator block 306 to the AEC block 304 for use by the AEC block 304 in cancelling the echo from the near-end signal Y(t) as described above. In step S514 the signal is output from the AEC block 304 via the IFFT block 312 as described above for transmission to the far-end device 108 in the call.

If in step S506 it is determined by the disturbance detector block 310 that at time $t_2$ there is a disturbance condition present on the near-end signal Y($t_2$) for a candidate delay then D is set to 1 for that candidate delay and the method passes to step S516.

In step S516 for the candidate delays where D=1 the signal generating blocks 406 determine the artificial near-end signals Y'($t_2$) which can be used in place of the near-end signal Y($t_2$) in order to estimate the delay between the far-end and near-end signals when there is disturbance on the near-end signals Y($t_2$) at time $t_2$. The signal generating blocks 406 determine the artificial near-end signals Y'($t_2$) for the candidate delays where D=1 based on: (i) the corresponding ones of the cross-covariance coefficients $r_{XY}(t_{min}-1, t_2-1)$ to $r_{XY}(t_{max}-1, t_2-1)$ that were calculated for the previous frame (at time $t_2-1$), and (ii) the corresponding delayed versions of the received far-end signal X for the N candidate delays ranging from X($t_{min}$) to X($t_{max}$). The determination of the artificial near-end signals Y'($t_2$) may also be based on the received near-end signal Y($t_2$) as described in more detail below.

For the candidate delays where D=1, the multiplexer blocks 408 pass the artificial near-end signals Y' ($t_2$) to the correlating blocks 402, such that in step S518 the correlating blocks 402 then determine respective correlation values ($r_{XY}(t_{min},t_2)$ to $r_{XY}(t_{max},t_2)$) between the delayed versions of the far-end signal X and the artificial near-end signals Y' for the candidate delays where D=1. As described above, the correlation values can be any values which indicate the similarity between the signals. For example, the correlation values may be cross-covariance coefficients, $r_{XY}$, as shown in FIG. 4, or could be the result of a mathematical correlation operation applied to the signals, or any other suitable function. The correlation values are output from the correlating blocks 402 to the maximum selector block 404 which selects the candidate delay with the highest of the correlation values to be used as the estimate of the delay between the far-end signal X and the near-end signal Y($t_2$) at time $t_2$. The method then passes from step S518 to steps S512 and S514 which are described above.

Therefore, advantageously, when there is disturbance on the near-end signal Y, the artificial near-end signals are used in order to estimate the delay between the far-end signal X and the near-end signal Y. In this way the delay estimate is robust to distortion on the near-end signal.

We present below an implementation of the process carried out by one of the signal generating blocks 406 for generating an artificial near-end signal Y'($t_2$) at time $t_2$. In the equations given below the near-end signal is received at a time $t_2$ and the equations relate to a candidate delay of $t_2-t_1$, such that the candidate delay relates to the far-end signal received at time $t_1$. In the following, it is shown how the artificial near-end signal Y'($t_2$) can be generated for the candidate delay $t_2-t_1$, for the case where the cross-covariance coefficient $r_{XY}(t_1, t_2)$ for the candidate delay is given by:

$$r_{XY}(t_1,t_2)=C_{XY}(t_1,t_2)/\text{sqrt}(C_{XX}(t_1,t_1)*C_{YY}(t_2,t_2)) \quad (1)$$

where, $C_{XY}(t_1,t_2)$ is the cross-covariance function between the far-end signal X($t_1$) at time $t_1$ and the near-end signal Y($t_2$) at time $t_2$, $C_{XX}(t_1,t_1)$ is the cross-covariance function between the far-end signal X($t_1$) at time $t_1$ and the far-end signal X($t_1$) at time $t_1$, and $C_{YY}(t_2,t_2)$ is the cross-covariance function between the near-end signal Y($t_2$) at time $t_2$ and the near-end signal Y($t_2$) at time $t_2$.

For zero mean input signals, the cross-covariance functions (for example, $C_{XY}(t_1,t_2)=R_{XY}(t_1,t_2)*m_X(t_1)*m_Y(t_2)$), simplify to cross-correlation functions, i.e., $R_{XY}(t_1,t_2)$, in the example given. In the equation above $m_X(t_1)$ denotes the ensemble average value of X at time $t_1$, $E\{X(t_1)\}$, and $m_Y(t_2)$ denotes the ensemble average value of Y at time $t_2$, $E\{Y(t_2)\}$.

Therefore, in the case of zero mean input signals, equation (1) given above simplifies to:

$$r_{XY}(t_1,t_2)=R_{XY}(t_1,t_2)/\text{sqrt}(R_{XX}(t_1,t_1)*R_{YY}(t_2,t_2)) \quad (2).$$

In equation (2), $R_{XY}(t_1,t_2)$ is the cross-correlation function between the far-end signal X($t_1$) at time $t_1$ and the near-end signal Y($t_2$) at time $t_2$, $R_{XX}(t_1,t_1)$ is the cross-correlation function between the far-end signal X($t_1$) at time $t_1$ and the far-end signal X($t_1$) at time $t_1$, and $R_{YY}(t_2,t_2)$ is the cross-correlation function between the near-end signal Y($t_2$) at time $t_2$ and the near-end signal Y($t_2$) at time $t_2$.

The cross-correlation functions are given (for real-valued and zero-mean inputs) by:

$$R_{XY}(t_1,t_2)=E\{X(t_1)*Y(t_2)\} \quad (3),$$

$$R_{XX}(t_1,t_1)=E\{X(t_1)*X(t_1)\} \quad (4),$$

$$R_{YY}(t_2,t_2)=E\{Y(t_2)*Y(t_2)\} \quad (5).$$

Assuming ergodicity we can estimate the ensemble averages by averaging a single realization of the stochastic process over time. To significantly reduce the complexity, the time averages are estimated using first order recursive filters with a smoothing coefficient denoted by mu. As an example, an estimate of $R_{XY}(t_1,t_2)$ is given by:

$$R_{XY}(t_1,t_2)=(1-mu)*R_{XY}(t_1-1,t_2-1)+mu*X(t_1)*Y(t_2) \quad (6).$$

The artificial near-end signal Y'($t_2$) is generated by the signal generating block 406 to replace the actual received near-end signal Y($t_2$) when a disturbance condition is present on the received near-end signal $Y(t_2)$. It can be shown that the artificial near-end signal $Y'(t_2)$ that would ensure that $r_{XY}(t_1, t_2)=r_{XY}(t_1-1,t_2-1)$ given the current input $X(t_1)$, can be found by solving a second order equation of the form:

$$a*(Y'(t_2))^2+b*Y'(t_2)+c=0 \qquad (7)$$

The discriminant is given by $d=b^2-4ac$.

When the discriminant $d>0$, two solutions exist and a person skilled in the art would know that equation (7) is solved by:

$$Y'(t_2)=(-b+-\text{sqrt}(d))/(2a) \qquad (8)$$

In the given example, the values of a, b and c are given by:

$$a=r^2_{XY}(t_1-1,t_2-1)*(mu*(1-mu)*R_{XX}(t_1-1,t_1-1)+ mu^2*X^2(t_1))-mu^2*X^2(t_1),$$

$$b=-2mu*(1-mu)*R_{XY}(t_1-1,t_2-1)*X(t_1), \text{ and}$$

$$c=r^2_{XY}(t_1-1,t_2-1)*((1-mu)^2*R_{XX}(t_1-1,t_1-1)* R_{YY}(t_2-1,t_2-1)+mu*(1-mu)*R_{YY}(t_2-1,t_2-1)* X^2(t_1))-(1-mu)^2*R^2_{XY}(t_1-1,t_2-1).$$

When there are two solutions for the artificial near-end signal $Y'(t_2)$, the one that is closest to the received, disturbance-contaminated near-end signal $Y(t_2)$ is selected to be used in the delay estimation process by the delay estimator block 306.

It can be appreciated that all of the terms required to calculate the values of a, b and c in the equations above for the artificial near-end signal $Y'(t_2)$ at time $t_2$ are either: (i) constants, (ii) variables which depend upon the values calculated for the previous frame at time $t_2-1$ (for example $r_{XY}(t_1-1,t_2-1)$, $R_{XX}(t_1-1,t_1-1)$, $R_{XY}(t_1-1,t_2-1)$ and $R_{YY}(t_2-1,t_2-1)$), or (iii) the far-end signal $X(t_1)$ received at time $t_1$. In this way the artificial near-end signal $Y'(t)$ can be generated recursively whilst the disturbance condition is determined to be present. By generating the artificial near-end signal such that the cross-variance coefficient $r_{XY}$ remains constant (which is achieved above by setting $r_{XY}(t_1,t_2)=r_{XY}(t_1-1,t_2-1)$ in the equations) it is ensured that the delay estimation is robust towards the disturbance on the near-end signal. In particular, the detrimental effect of the near-end disturbance on the selection of the candidate delay for use as the estimate of the delay between the two signals will be reduced.

When the discriminant $d<=0$, a single solution is found in the top of the parabola that is closest to zero (that is the best estimate of the artificial near-end signal $Y'(t_2)$) and is given by:

$$Y'(t_2)=-b/(2a).$$

Figure 6:
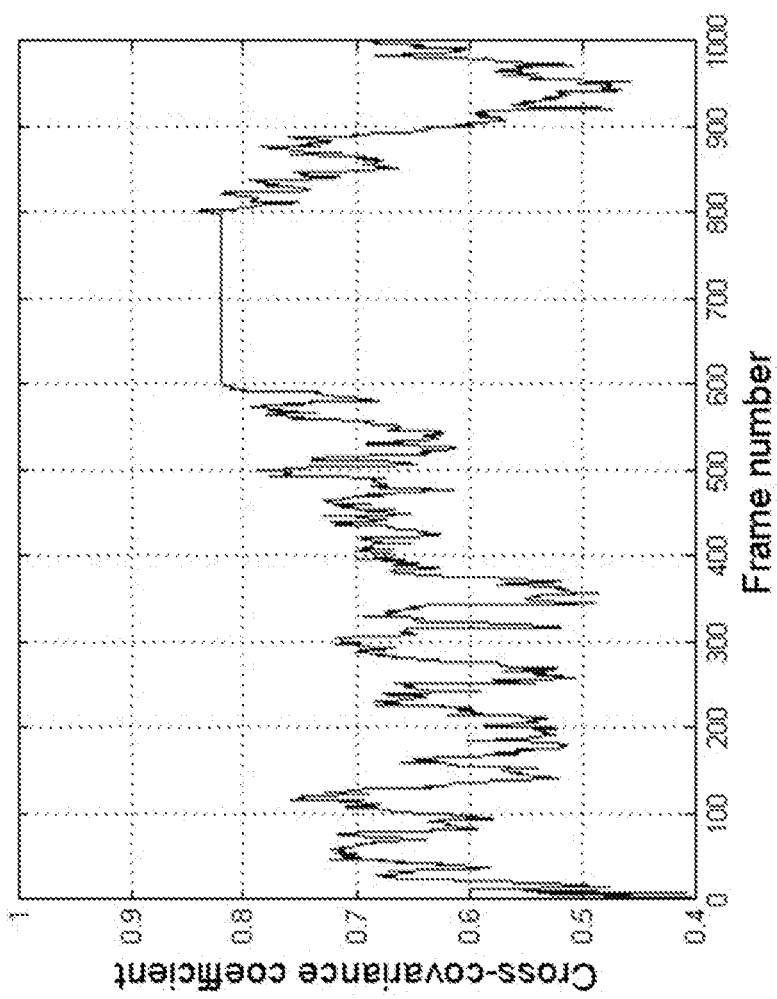
FIG. 6 is a graph representing a cross-covariance coefficient which has been estimated according to a method in accordance with one or more embodiments.

FIG. 6 shows a graph representing an example of a cross-covariance coefficient, $r_{XY}$, of a near-end signal for one of the candidate delays (e.g. the maximum candidate delay) which has been estimated as described above. For frames 0 to 600, the disturbance detector block 310 does not detect disturbance on the near-end signal $Y(t)$, and as such $D=0$. Therefore for frames 0 to 600 the multiplexer block $408_0$ (associated with the maximum candidate delay) selects the real near-end signal $Y(t)$ to pass to the correlating block $402_0$. It can be seen in FIG. 6 that the cross-covariance coefficient, $r_{XY}$, for the maximum candidate delay varies over time from frame 0 to frame 600. Then, between frames 600 and 800 the disturbance detector block 310 detects disturbance on the near-end signal $Y(t)$ (e.g. near-end speech or clipping of the near-end signal due to overloading), and as such $D=1$. Therefore for frames 600 to 800 the multiplexer block $408_0$ (associated with the maximum candidate delay) selects the artificial near-end signal $Y'(t)$ to pass to the correlating block $402_0$. As described above, the artificial near-end signal is generated by the signal generating block $406_0$ for the maximum candidate delay such that the cross-covariance coefficient, $r_{XY}$, is constant as the far-end signal $X(t)$ varies, while $D=1$. It can be seen in FIG. 6 that the cross-covariance coefficient, $r_{XY}$, for the maximum candidate delay is constant over time from frame 600 to frame 800. At frame 800 the disturbance condition is no longer present on the near-end signal $Y(t)$ and as such for frames 800 and above, the disturbance detector block 310 does not detect disturbance on the near-end signal $Y(t)$, and as such $D=0$. Therefore, for frames 800 and above the multiplexer block $408_0$ (associated with the maximum candidate delay) selects the received near-end signal $Y(t)$ to pass to the correlating block $402_0$. It can be seen in FIG. 6 that the cross-covariance coefficient, $r_{XY}$, for the maximum candidate delay varies over time from frame 800 onwards.

The graph in FIG. 6 is described in relation to the maximum candidate delay, but the same would apply for the other candidate delays also.

The methods described above keep updating a single copy of the far-end signal $X(t)$, and correct the near-end signal $Y(t)$ (by generating and using the artificial near-end signal $Y'(t)$) in a way that preserves the cross-covariance coefficient at a constant value during periods of disturbance (e.g. double-talk) on the near-end signal $Y(t)$. An interpretation of this is that we update the delay estimate as if the microphone signal (that is, the near-end signal) would lead to the same cross-covariance coefficient as the previous frame, given the received far-end signal $X(t)$. This method is computationally inexpensive since only one copy of the far-end signal $X(t)$ is required to be maintained. For comparison, in one other method, when disturbance is detected, both the near-end and far-end signals may be frozen (i.e. not updated). This would require a copy of each of the far-end dependent states to be updated independently for each delay candidate, and is therefore somewhat computationally expensive and memory inefficient.

In the implementation described above and shown in FIG. 4, the artificial signals $Y'(t)$ are generated by the signal generating blocks when the disturbance detector block 310 detects disturbance on the near-end signal $Y(t)$ (i.e. when $D=1$) and also when the disturbance detector block 310 does not detect disturbance on the near-end signal $Y(t)$ (i.e. when $D=0$), and then the multiplexer blocks 408 select either the artificial near-end signals $Y'(t)$ or the received near-end signal $Y(t)$ to pass to the correlating blocks 402. In alternative embodiments, the signal generating blocks 406 may only generate the artificial signals when the disturbance detector block 310 detects disturbance on the near-end signal, i.e. only when $D=1$. In these alternative embodiments, processing power is saved since the signal generating blocks 406 do not generate the artificial near-end signals $Y'(t)$ when $D=0$, i.e. when the multiplexer blocks 408 are not going to select the artificial near-end signals $Y'(t)$ to be passed to the correlating blocks 402.

In the embodiments described above, when a disturbance condition is present (i.e. when $D=1$) the artificial near-end signals $Y'$ are used in place of the received near-end signal $Y$ to determine the estimate of the delay between the far-end signal $X$ and the received near-end signal $Y$. However, in alternative embodiments, when a disturbance condition is present (i.e. when $D=1$) the artificial near-end signals $Y'$ are used in combination with the received near-end signal $Y$ to determine the estimate of the delay between the far-end signal $X$ and the received near-end signal $Y$. In these embodiments, the updating of the delay estimate is done based on a mix of the artificial near-end signals $Y'$ and the received near-end signal Y. This can be beneficial in some scenarios, e.g. when there is some, but not a high level of, disturbance on the received near-end signal Y. One way to implement this combination of artificial and real near-end signals, would be to replace the multiplexer blocks 408 in the delay estimator block 306 with respective combining blocks that each take the received near-end signal Y and one of the artificial near-end signals Y' as inputs and use a combining function to determine and output a combination of the received near-end signal Y and the one of the artificial near-end signals Y'. The combining function may, for example, be an averaging function such that each combining block would output an average of the received near-end signal Y and the one of the artificial near-end signals Y' to the corresponding correlating block 402. Other combining functions may be used. For example, a combining function may be used that depends upon the level of disturbance in the received near-end signal. For example, the combining function may be weighted to include an increased proportion of the artificial near-end signals Y' (relative to the received near-end signal Y) when the level of disturbance in the received near-end signal Y is increased, as detected by the disturbance detector block 310. To implement this, the disturbance detector block 310 may determine a level of disturbance in the received near-end signal Y such that D can take more than just the two discrete values of 0 or 1 that are described above. For example, D may take one of more than two possible discrete values (e.g. 0, 0.5 or 1), or D may be a continuous value between 0 and 1.

In the embodiments described above, the delay estimation method is performed in the frequency domain (i.e. after the FFT blocks 302 and 308 and before the IFFT block 312). In alternative embodiments the delay estimation method could be performed in the time domain, such that no FFT blocks or IFFT blocks are required.

In the embodiments described above the signal values (e.g. X(t), Y(t) and Y'(t)) are amplitude values which indicate the amplitude of the respective signals. When the signal values are squared they represent powers.

The methods described above, relate to estimating a delay between two signals which can then be used in an echo cancellation process. However, the same principles apply when estimating a delay between two (or more) signals for use in other processes and are not limited to the case of echo cancellation. Indeed the methods could be used in any suitable system where the delay between two signals is required to be estimated. For example, the method could be used to determine the delay between signals received at a beamformer, wherein there is a delay between the signals caused by the spatial difference in the position of the microphones used to receive the different ones of the input signals used in a beamformer microphone arrangement. The method could be used in any system where an angle or a delay between two received signals needs to be estimated. Furthermore, the method is not limited to use with audio signals and there may be application areas within radar, sonar, antennas and such like.

The blocks shown in FIGS. 3 and 4 may be implemented in software executed on the CPU 202 or implemented in hardware in the device 102. When the blocks are implemented in software, they may be provided by way of a computer program product embodied on a non-transient computer-readable medium which is configured so as when executed on the CPU 202 of the device 102 to perform the function of the blocks as described above. The method steps S506 to S512 and S516 and S518 may be performed by functional blocks shown in FIGS. 3 and 4 as software or hardware blocks, as would be apparent to a person skilled in the art.

Furthermore, while the various embodiments have been particularly shown and described with reference to the above examples, it will be understood to those skilled in the art that various changes in form and detail may be made without departing from the scope of the claimed subject matter as defined by the appendant claims.

The invention claimed is:

1. A method of estimating a delay between a first signal and a second signal, the method comprising:
receiving the first signal;
receiving the second signal;
for each of a plurality of candidate delays between the received first signal and the received second signal, determining a correlation value between the received first signal and the received second signal; and
based on the determined correlation values, selecting one of the plurality of candidate delays to be used as an estimate of the delay between the received first signal and the received second signal, wherein the method further comprises:
determining that a disturbance condition is present on the received second signal for at least one of the plurality of candidate delays;
while the disturbance condition is determined to be present, for each of said at least one of the plurality of candidate delays: generating an artificial second signal, wherein the artificial second signal is generated such that a correlation value for the candidate delay between the received first signal and the artificial second signal is kept constant at a value based on a determined correlation value for the candidate delay between the received first signal and the received second signal prior to determining that the disturbance condition is present; and
while the disturbance condition is determined to be present, using the artificial second signal in combination with the received second signal for said at least one of the plurality of candidate delays in order to select one of the plurality of candidate delays to be used as the estimate of the delay between the received first signal and the received second signal.

2. The method of claim 1 wherein said using the artificial second signal for said at least one of the plurality of candidate delays in order to select one of the plurality of candidate delays comprises:
based on the correlation values for said at least one of the plurality of candidate delays between the received first signal and the artificial second signal, selecting one of the plurality of candidate delays to be used as the estimate of the delay between the received first signal and the received second signal.

3. The method of claim 1 wherein the method is implemented in a device, wherein the first signal is received at the device over a network and is subsequently output from the device, and wherein the second signal is received using a receiver of the device, the second signal including: (i) echo components originating from the outputted first signal, and (ii) disturbance components.

4. The method of claim 3 wherein the disturbance components result from at least one of: (i) speech signals received at the receiver of the device, (ii) clipping of the received second signal due to overloading of components of the device, and (iii) noise received at the receiver of the device.

5. The method of claim 3 wherein the disturbance condition is determined to be present on the received second signal when the ratio of the power of the disturbance components to the power of the echo components exceeds a threshold value.

6. The method of claim 3 wherein the disturbance condition is determined to be present on the received second signal when the disturbance components have speech characteristics which differ from characteristics of the echo components, thereby indicating a double-talk condition.

7. The method of claim 1 wherein the first and second signals are audio signals.

8. The method of claim 1 wherein the method is implemented during a call between two users over a communication system, wherein the first signal is a far-end signal of the call and the second signal is a near-end signal of the call.

9. The method of claim 1 wherein the correlation value between the first signal received at time $t_1$ and the second signal received at time $t_2$ is a cross-covariance coefficient, $r_{XY}(t_1,t_2)$, given by the equation:

$$r_{xy}(t_1,t_2) = C_{XY}(t_1,t_2)/\sqrt{(C_{XX}(t_1,t_1) * C_{yy}(t_2,t_2))},$$

where $C_{XY}(t_1,t_2)$ is a cross-covariance function between the first signal at time $t_1$ and the second signal at time $t_2$, $C_{XX}(t_1,t_1)$ is a cross-covariance function between the first signal at time $t_1$ and the first signal at time $t_1$, and $C_{YY}(t_2,t_2)$ is a cross-covariance function between the second signal at time $t_2$ and the second signal at time $t_2$.

10. The method of claim 9 wherein, when the mean of the first signal is zero and the mean of the second signal is zero:
  (i) the cross-covariance function $C_{XY}(t_1,t_2)$ is represented by an estimate of the ensemble average over time of the product of first signal at time $t_1$, $X(t_1)$, and the second signal at time $t_2$, $Y(t_2)$, said estimate of the ensemble average being determined using a first order recursive filter;
  (ii) the cross-covariance function $C_{XX}(t_1,t_1)$ is represented by an estimate of the ensemble average over time of the product of first signal at time $t_1$, $X(t_1)$, and the first signal at time $t_1$, $X(t_1)$; and
  (iii) the cross-covariance function $C_{YY}(t_2,t_2)$ is represented by an estimate of the ensemble average over time of the product of second signal at time $t_2$, $Y(t_2)$, and the second signal at time $t_2$, $Y(t_2)$.

11. The method of claim 1 further comprising applying echo cancellation to the received second signals to cancel echo in the received second signal, said echo resulting from an output of the first signal, wherein the echo cancellation uses the estimate of the delay between the received first signal and the received second signal.

12. The method of claim 1 wherein the step of determining that a disturbance condition is present on the received second signal for at least one of the plurality of candidate delays comprises separately determining for each of the plurality of candidate delays whether the disturbance condition is present on the received second signal.

13. The method of claim 1 wherein the step of determining that a disturbance condition is present on the received second signal for at least one of the plurality of candidate delays comprises making a determination that the disturbance condition is present for all of the plurality of candidate delays.

14. A device for estimating a delay between a first signal and a second signal, the device comprising:
  a first receiver configured to receive the first signal;
  a second receiver configured to receive the second signal;
  a correlation determining block configured to determine, for each of a plurality of candidate delays between the received first signal and the received second signal, a correlation value between the received first signal and the received second signal;
  a selector block configured to select one of the plurality of candidate delays, based on the determined correlation values, to be used as an estimate of the delay between the received first signal and the received second signal;
  a disturbance determining block configured to determine that a disturbance condition is present on the received second signal for at least one of the plurality of candidate delays; and
  one or more signal determining blocks configured to generate an artificial second signal for each of said at least one of the plurality of candidate delays while the disturbance condition is determined to be present, wherein the signal determining blocks are configured to generate the artificial second signal for each of said at least one of the plurality of candidate delays such that a correlation value for the candidate delay between the received first signal and the artificial second signal is kept constant at a value based on a determined correlation value for the candidate delay between the received first signal and the received second signal prior to determining that the disturbance condition is present,
  wherein the device is configured such that while the disturbance condition is determined to be present, the device is configured to use the artificial second signal in combination with the received second signal for said at least one of the plurality of candidate delays in order to select one of the plurality of candidate delays to be used as the estimate of the delay between the received first signal and the received second signal.

15. The device of claim 14 wherein the first and second signals are audio signals and wherein the first receiver comprises a network interface and the second receiver comprises a microphone.

16. The device of claim 14 further comprising an echo cancelling block configured to apply echo cancellation to the received second signals to cancel echo in the received second signal, said echo resulting from an output of the first signal at the device, wherein the echo cancelling block is configured to use the estimate of the delay between the received first signal and the received second signal in said echo cancellation.

17. A hardware computer-readable medium storing a computer program product for estimating a delay between a first signal and a second signal, the computer program product being configured so as when executed on a processor of a device to perform a method comprising:
  receiving the first signal;
  receiving the second signal;
  for each of a plurality of candidate delays between the received first signal and the received second signal, determining a correlation value between the received first signal and the received second signal; and
  based on the determined correlation values, selecting one of the plurality of candidate delays to be used as an estimate of the delay between the received first signal and the received second signal, wherein the computer program product is further configured so as when executed on a processor of a device to perform the further operations of:
  determining that a disturbance condition is present on the received second signal for at least one of the plurality of candidate delays;
  while the disturbance condition is determined to be present, for each of said at least one of the plurality of candidate delays: generating an artificial second signal, wherein the artificial second signal is generated such that a correlation value for the candidate delay between the received first signal and the artificial second signal is kept constant at a value based on a determined correlation value for the candidate delay between the received first signal and the received second signal prior to determining that the disturbance condition is present; and while the disturbance condition is determined to be present, using the artificial second signal in combination with the received second signal for said at least one of the plurality of candidate delays in order to select one of the plurality of candidate delays to be used as the estimate of the delay between the received first signal and the received second signal.

18. The method of claim 1, wherein said generating an artificial second signal comprises:

identifying two or more artificial signal candidates that are usable for said at least one of the plurality of candidate delays;

selecting an artificial signal candidate that is closest to the received second signal as the artificial second signal to be used in combination with the received second signal.

19. The device of claim 14, wherein the one or more signal determining blocks are configured to generate an artificial second signal by:

identifying two or more artificial signal candidates that are usable for said at least one of the plurality of candidate delays;

selecting an artificial signal candidate that is closest to the received second signal as the artificial second signal to be used in combination with the received second signal.

20. The hardware computer-readable medium of claim 17, wherein said generating an artificial second signal comprises:

identifying two or more artificial signal candidates that are usable for said at least one of the plurality of candidate delays;

selecting an artificial signal candidate that is closest to the received second signal as the artificial second signal to be used in combination with the received second signal.

21. The hardware computer-readable medium of claim 17, wherein said generating an artificial signal is performed when the disturbance condition is determined to be present, and is not performed when the disturbance condition is not determined to be present.

* * * * *